US012746733B2

(12) United States Patent
Mero et al.

(10) Patent No.: US 12,746,733 B2
(45) Date of Patent: Sep. 29, 2026

(54) APPARATUS AND A METHOD FOR PRODUCING DISH-SHAPED PRODUCT PACKAGES

(71) Applicant: JOSPAK OY, Taneli (FI)

(72) Inventors: Taneli Mero, Forssa (FI); Jari Vuorinen, Valkeakoski (FI)

(73) Assignee: JOSPAK OY, Forssa (FI)

( * ) Notice: Subject to any disclaimer, the term of this patent is extended or adjusted under 35 U.S.C. 154(b) by 201 days.

(21) Appl. No.: 17/913,322

(22) PCT Filed: Feb. 8, 2022

(86) PCT No.: PCT/FI2022/050076

§ 371 (c)(1),
(2) Date: Sep. 21, 2022

(87) PCT Pub. No.: WO2022/200677

PCT Pub. Date: Sep. 29, 2022

(65) Prior Publication Data

US 2024/0208173 A1 Jun. 27, 2024

(30) Foreign Application Priority Data

Mar. 22, 2021 (FI) .................................... 20215319

(51) Int. Cl.
*B31B 50/44* (2017.01)
*B65D 5/20* (2006.01)
(Continued)

(52) U.S. Cl.
CPC ................ *B31B 50/44* (2017.08); *B65D 5/20* (2013.01); *B31B 2105/0024* (2017.08); *B31B 2110/30* (2017.08); *B31B 2120/002* (2017.08)

(58) Field of Classification Search
CPC ............ B31B 50/44; B31B 2105/0024; B31B 2110/30; B31B 2120/002; B65D 5/20
See application file for complete search history.

(56) References Cited

U.S. PATENT DOCUMENTS 4,533,065 A * 8/1985 Chazal .................. B29C 51/165 229/110
5,679,109 A * 10/1997 Gics .................. B29C 66/24244 156/566
(Continued)

FOREIGN PATENT DOCUMENTS

EP 3141373 A1 3/2017
JP 2012192558 A * 10/2012

OTHER PUBLICATIONS

Applicant: Jospak Oy; International Application No. PCT/FI2022/050076 Filed Feb. 8, 2022; PCT International Search Report and Written Opinion; 9 pgs.

*Primary Examiner* — Eyamindae C Jallow
(74) *Attorney, Agent, or Firm* — Tarolli, Sundheim, Covell & Tummino LLP

(57) ABSTRACT

The object of the invention is an apparatus and a method for producing dish-shaped product packages, which apparatus comprises a forming station (10) for product packages, in connection with which forming station is a secondary tool (20) with secondary moulds (21), a heating station and a primary tool (18) with primary moulds (19) for feeding the sheet-like, fiber-based blanks to be formed into product packages into the forming of product packages. The apparatus also comprises a control system for controlling the functions of the apparatus, and in connection with the apparatus is a film track (12) for providing a formed product package with a film functioning as an inner lining. Preferably, the primary tool (18) comprises two or more primary moulds (19) side by side.

9 Claims, 4 Drawing Sheets

Figure 1:
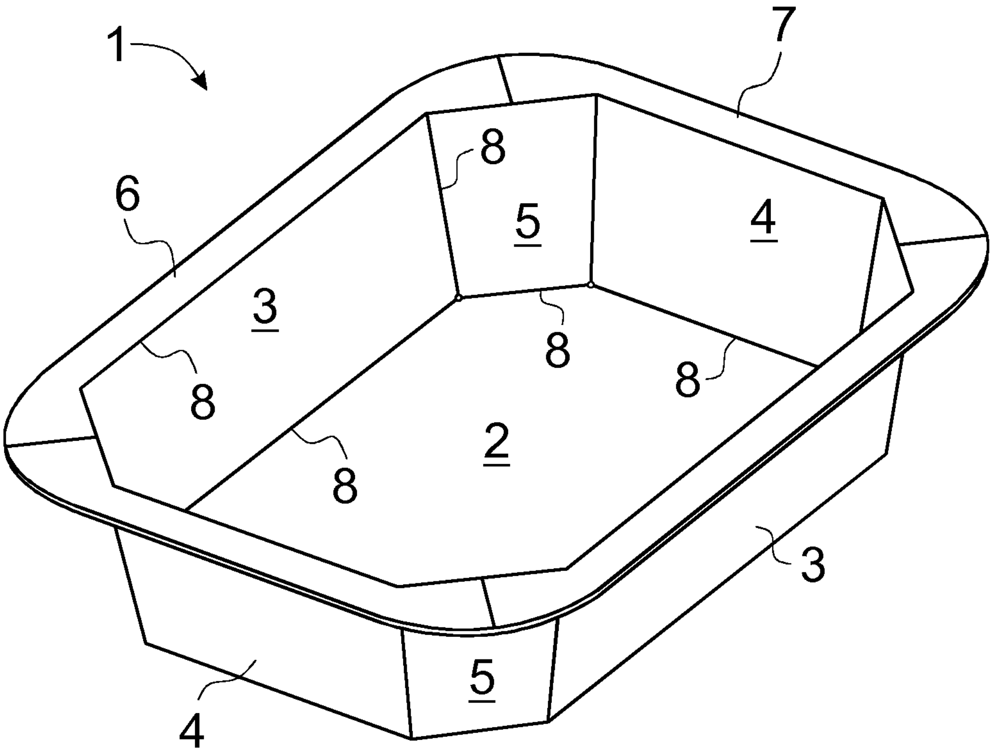

(51) Int. Cl.

| | |
|---|---|
| *B31B 105/00* | (2017.01) |
| *B31B 110/30* | (2017.01) |
| *B31B 120/00* | (2017.01) |

(56) References Cited

U.S. PATENT DOCUMENTS

| | | | | |
|---|---|---|---|---|
| 2007/0262487 | A1* | 11/2007 | O'Hagan | B65D 1/26 264/241 |
| 2019/0160775 | A1* | 5/2019 | Mößnang | B31B 50/142 |
| 2021/0053712 | A1* | 2/2021 | Hargreaves | B65B 47/06 |

* cited by examiner

APPARATUS AND A METHOD FOR PRODUCING DISH-SHAPED PRODUCT PACKAGES

The object of the invention is an apparatus and a method for producing dish-shaped product packages.

Known in the art are dish-shaped foodstuff packages and methods for producing them, which foodstuff packages are produced e.g. from paperboard or corresponding and lined inside with a separate food-grade film, as in conventional plastic packages.

One such solution is presented in European patent publication no. EP2441697 Bl. The solution according to the publication in question applies to a method for producing foodstuff packages from straight, unfolded paperboard blanks that are pre-cut and detached from each other. According to the patent, one unfolded blank at a time is pressed in a mould into the shape of a dish-shaped bowl and the inner surface of the bowl formed is provided with a separate food-grade film. FIGS. 1A-1C of the patent present this production phase.

The description of the aforementioned European patent publication no. EP2441697 B1 states that it could be preferred to laminate a number of boxes simultaneously with a single plastic foil so that the boxes can be kept together by means of the plastic foil. In this context it is specifically emphasized that the finished dishes are held together by means of a plastic film. In this context nothing is mentioned, however, about pressing the blanks into a mould, but the expression gives cause to assume that in the phase when the blanks are pressed into a mould they have already been separate. Elsewhere, also, the description supports pressing separate blanks into a mould, so the patent at no stage gives the impression that when pressing blanks into a mould more blanks than one would be attached to each other, and that at the same time there would be more moulds than one.

Generally speaking, in solutions known in the art fixed moulds are used, which do not move in relation to each other. In that case one drawback is that it is necessary to use two suction mould feeder stations so that the formed product packages are close enough to each other to reduce film wastage. Group die-cutting is a widely used method for producing blanks and for reducing the consumption of material, but before formation of the product packages, the blanks in a group are usually separated to be used one at a time. Fixed moulds cause film wastage, while detachment of the blanks from a die-cut group of blanks before forming of the product packages requires tools and an entirely separate work phase, which incurs costs and reduces capacity. According to what is known in the art, the blanks detached from a blank group are usually placed in a forming machine by hand or the feeding of blanks into the machine requires an intermediate transfer from the blank pallet into the blank magazine of the forming machine. All this increases costs and processing time while also adding to the opportunities for errors.

European patent application publication no. EP3141373 discloses an apparatus and a method for producing dish-shaped product packages. However, this solution differs from the solution of the present invention.

The aim of the present invention is to eliminate the aforementioned drawbacks and to provide an inexpensive and fast method and apparatus for producing dish-shaped product packages, which save food-grade plastic in the production phase.

To achieve this aim, the apparatus according to the invention for producing dish-shaped product packages comprises a forming station for product packages, in connection with which station is a secondary tool with secondary moulds, a heating station and a primary tool with primary moulds for feeding the sheet-like, fiber-based, individual blanks to be formed into product packages into the forming of product packages. The apparatus also comprises a control system for controlling the functions of the apparatus, and in connection with the apparatus is a film track for providing a formed product package with a film functioning as an inner lining. Preferably the primary tool comprises two or more primary moulds that are side by side. In addition, the primary tool comprises gripping means for feeding a group blank formed by two or more individual blanks of a product package, the individual blanks being side by side and attached to each other, to a secondary tool.

In one preferred solution according to the invention, the apparatus comprises means for moving the secondary moulds towards each other and away from each other in the production phase of the product packages.

The invention also relates to a method for producing dish-shaped product packages in an apparatus comprising a forming station for product packages, in connection with which forming station is a secondary tool with secondary moulds, a heating station and a primary tool with primary moulds for feeding the sheet-like, fiber-based, individual blanks to be formed into product packages into the forming of product packages, and which apparatus comprises a control system for controlling the functions of the apparatus, and in connection with which apparatus is a film track for providing formed product packages with a film functioning as an inner lining, in which method product packages are produced by shaping each individual blank in a mould for a dish-shaped product package, the second surface of which product package is provided with food-grade film functioning as an inner lining. Preferably the method comprises one or more of the following phases:

- two or more side-by-side primary moulds and a sheet-like group blank comprising two or more side-by-side individual blanks to be formed into product packages are transferred onto two or more secondary moulds;
- when the primary moulds are in vertical line on top of the secondary moulds, the moulds are pressed together in such a way that the group blank remains between the top moulds and secondary moulds, one individual blank of the group blank at the point of each top mould and each secondary mould;
- the forming of the product packages is performed by exerting force on the group blank that is between the top moulds and secondary moulds, with which force the individual blanks in the group blank are detached from each other and the detached individual blanks are pressed into their position in the secondary moulds;
- after forming, the fastening of the film functioning as an inner lining to the second surface of the product packages is performed each time to all the formed product packages essentially simultaneously.

In one preferred method according to the invention, the primary moulds are moved away from on top of the secondary moulds after forming, and in the forming phase the secondary moulds that were on the same vertical line as the primary moulds are moved in a straight row towards each other to a position in which the horizontal distance of the outermost secondary moulds from each other is smaller than the horizontal distance of the outermost primary moulds from each other, after which the fastening of the film functioning as an inner lining to the second surface of the product packages is performed each time essentially simultaneously to all the formed product packages.

Correspondingly, after fastening of the film, the secondary moulds are moved in a straight row away from each other to a position in which the horizontal distance of the outermost secondary moulds from each other is as great as the horizontal distance of the outermost primary moulds from each other.

In another preferred method according to the invention, after forming, the film to be fastened as an inner lining to the second surface of product packages is taken from the film on the own film track of each side-by-side product package, which film is of a specific width in relation to the width of the product package.

One advantage of the solution according to the invention is, inter alia, that the speed of producing product packages and the accuracy of forming improve. Furthermore, the solution according to the invention improves efficiency in the use of food-grade film and of frame material, as well as in transportation logistics, by enabling delivery of larger amounts of material per delivery batch. The tight grouping of product package blanks in the blanking phase enhances the efficiency of transporting them. Furthermore, the amount of material required per blank is reduced, which enhances the efficiency of the whole supply chain. One advantage also is a reduced carbon footprint. Another advantage in the production phase is also a reduction in rotational error in the positioning of individual blanks owing to the greater torque arm, because the individual blanks from which the dishes are formed in each pressing cycle are side by side against each other. Yet another advantage is that the solution according to the invention enables the taking of blanks for forming a dish directly from the blank pallet, with which the group blanks cut into shape are brought to the production unit. In this case there is no need for detaching individual blanks nor for separate handling of them. The processing of many individual blanks simultaneously as one group blank simplifies the forming phase. Yet another major advantage is the reduced film wastage by means of the solution according to the invention.

Figure 2:
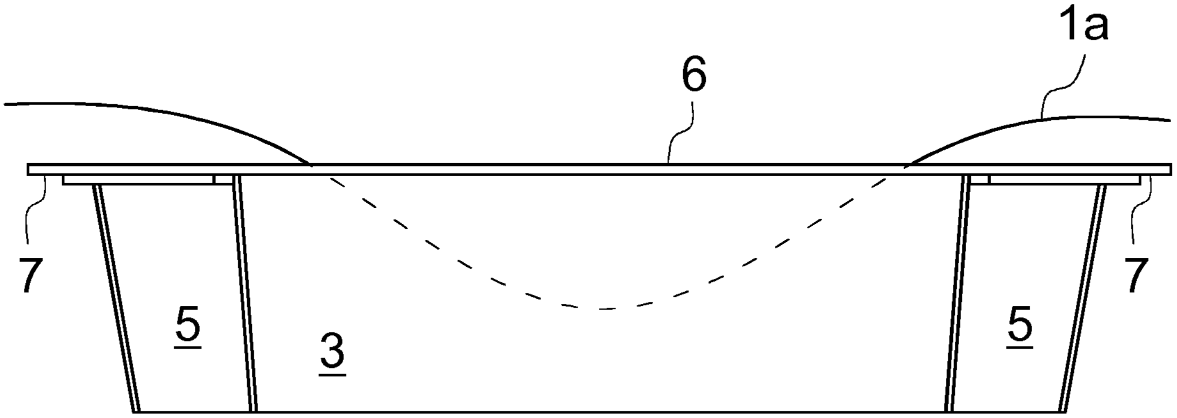
Figure 3:
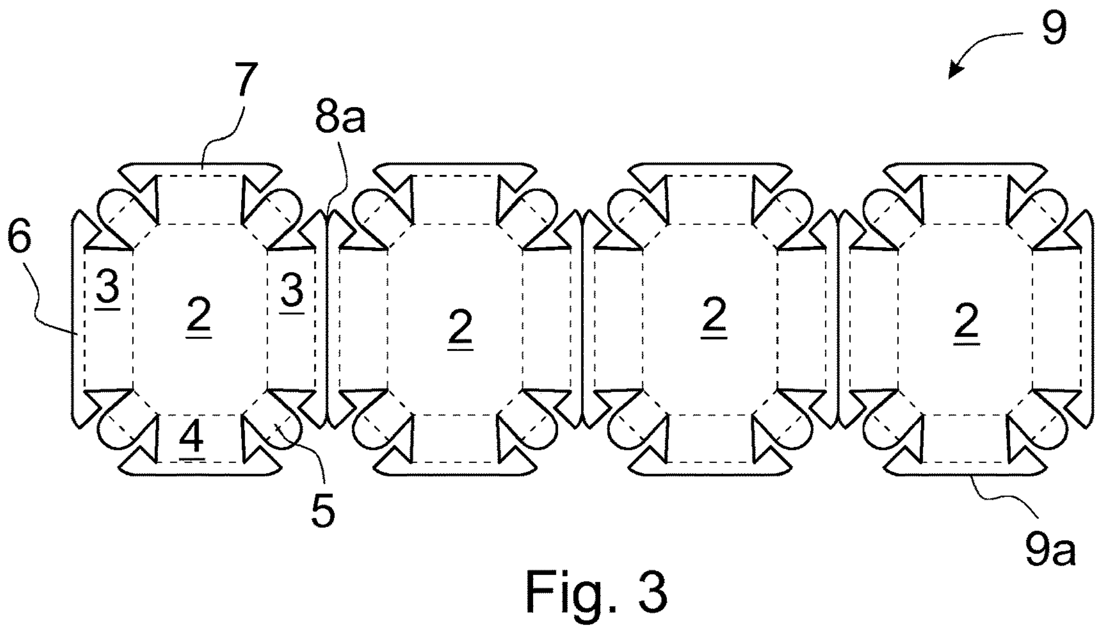
Figure 4:
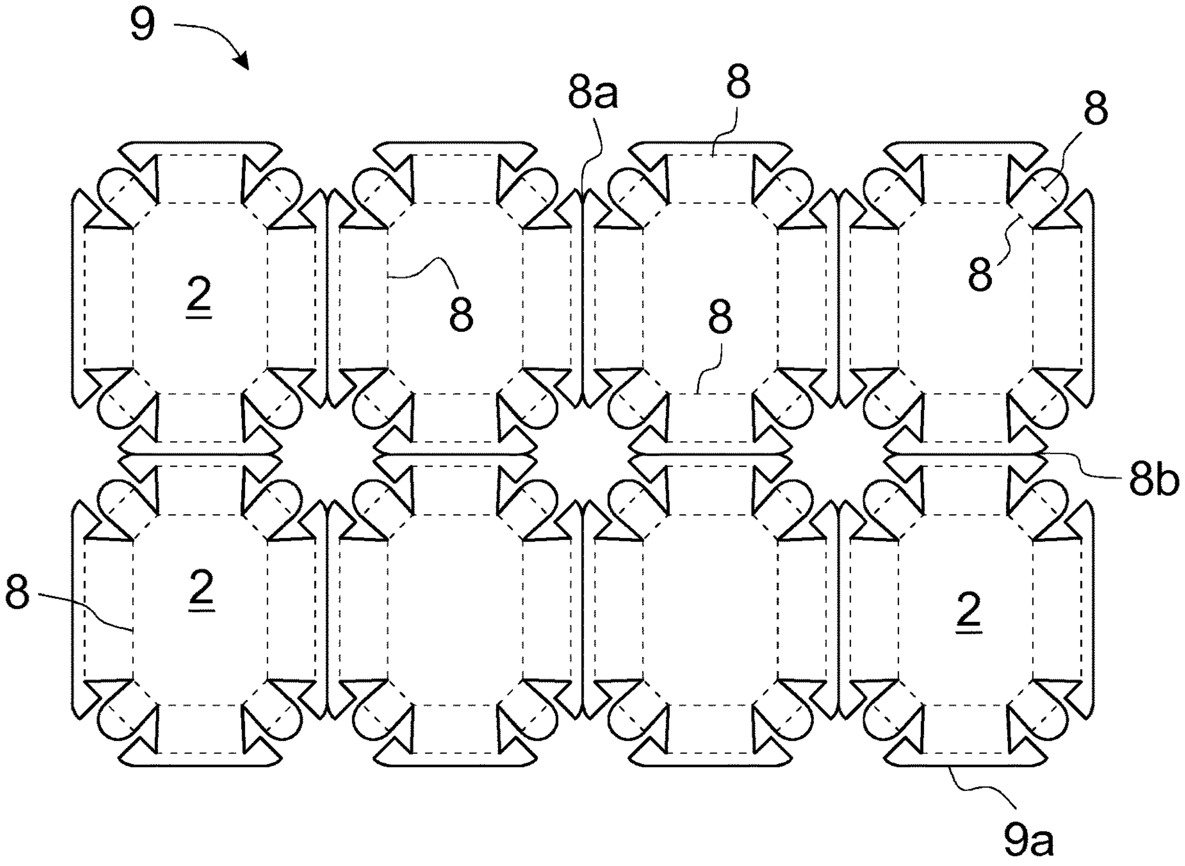
Figure 5:
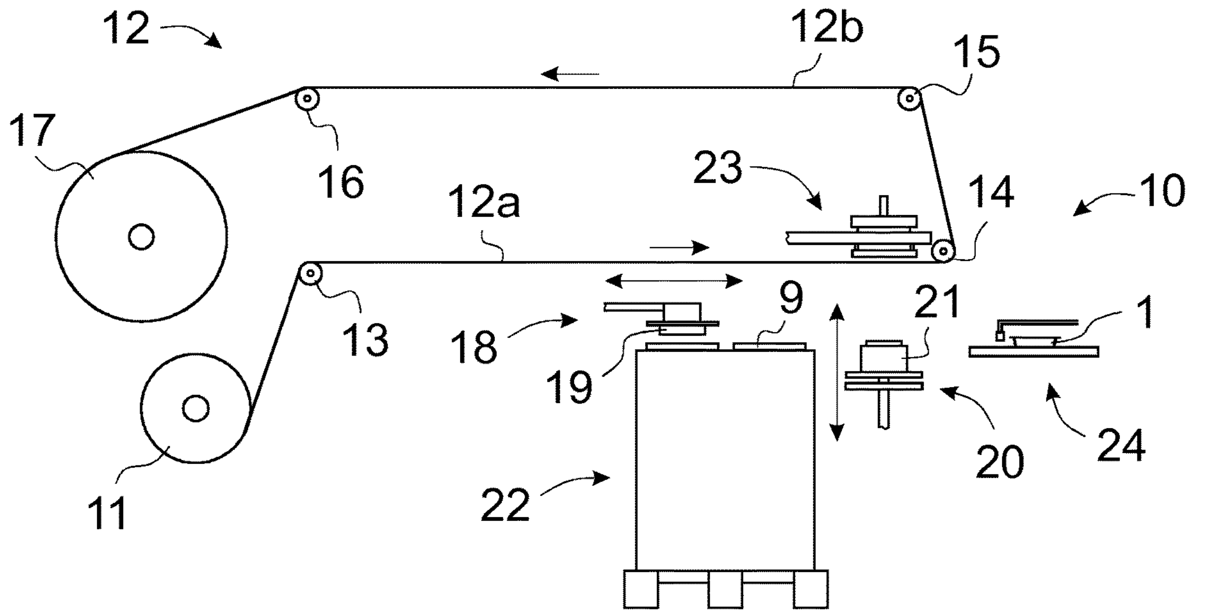
Figure 6:
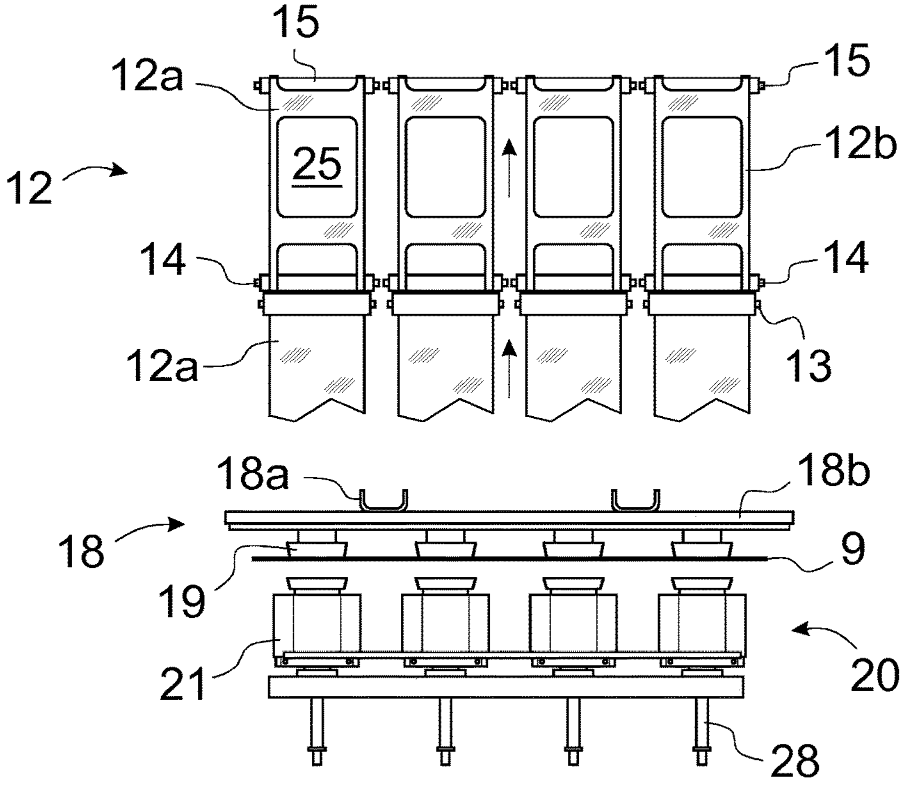
Figure 7:
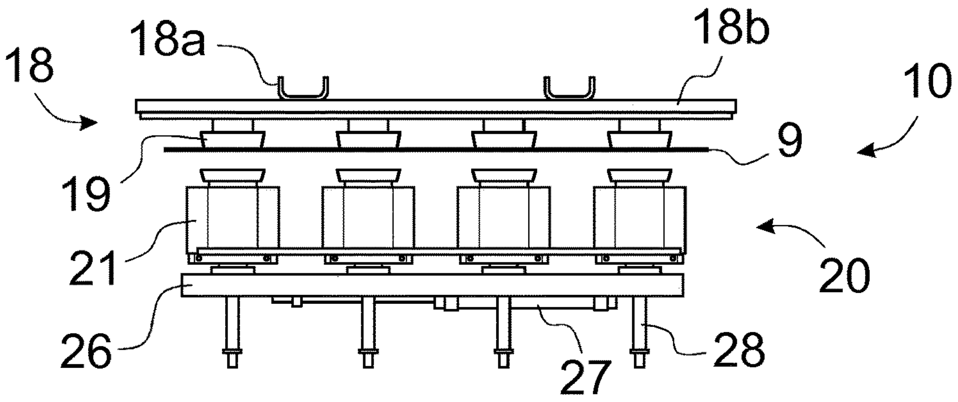
Figure 8:
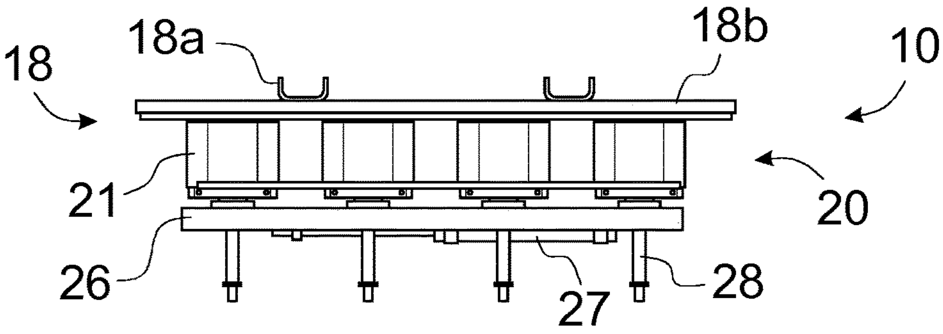
Figure 9:
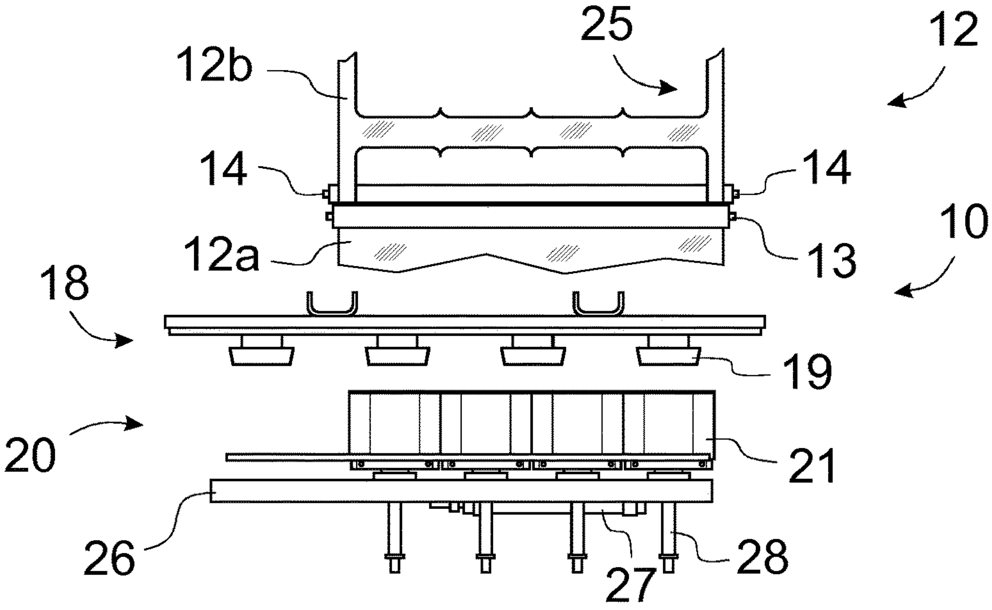

In the following, the invention will be described in more detail by the aid of some preferred embodiments with reference to the attached drawings, wherein FIG. 1 presents one product package produced with the apparatus and with the method according to the invention, as viewed obliquely from the side and from above, FIG. 2 presents a diagrammatic side view of a product package according to FIG. 1 and of the food-grade film to be fastened onto its inner surface, FIG. 3 presents a top view of one group blank for producing product packages of one type according to the invention, FIG. 4 presents a top view of a second group blank for producing product packages according to FIG. 3, FIG. 5 presents a simplified side view of a part of one apparatus according to the invention for producing a dish-shaped product package, FIG. 6 presents a simplified front view of a part of one apparatus according to FIG. 5 for producing a dish-shaped product package, FIG. 7 presents a simplified front view of a part of a second apparatus according to FIG. 5 for producing a dish-shaped product package, in a situation in which a group blank is being transferred into moulds for simultaneously forming more than one dish-shaped product package from a sheet-like group blank, FIG. 8 presents a simplified front view of a part of an apparatus according to FIG. 7 for producing a dish-shaped product package, in a situation in which a plurality of dish-shaped product packages have just been formed by pressing a group blank into side-by-side moulds, and FIG. 9 presents a simplified front view of a part of an apparatus according to FIG. 7 for producing a dish-shaped product package, in a situation in which the secondary moulds of the apparatus have been moved towards each other, or are even in contact with each other, and are preparing for the lining with food-grade film of the inner surface of the product packages just formed.

FIG. 1 presents one product package 1 produced with the apparatus and the method according to the invention, as viewed obliquely from the side and from above, the frame part of the product package comprising a base 2 and eight wall sections, i.e. two side walls 3, two end walls 4 and four corner walls 5, the corner walls being between the side walls 3 and the end walls 4. In addition, the product package 1 has edge sections 6 and 7 extending outwards from the top edge of the wall sections 2-4, which edge sections are arranged to form an essentially flat surface for the lid of the product package. The first edge sections 6 are on the sides of the product package 1 and the second edge sections 7 are on the ends of the product package. Preferably the ends of the first edge sections 6 and of the second edge sections 7 are fitted against each other on the vertical center line of the corner walls 5, in which case the seam 5 between the first edge sections 6 and of the second edge sections 7 is also essentially on the vertical center line of the corner walls 5.

Preferably the fold lines 8 of the base 2, walls 3-5 and edge sections 6, 7 of the frame part are provided with small openings, through which air can be sucked in the production phase of the product package 1. The openings can be consecutive, in the manner of perforation, and their size and shape can vary. Thus, they can be e.g. essentially round or narrow, dash-shaped, rectangular apertures. There can also be creasing, or some corresponding structure, in the fold lines 8 to facilitate folding.

Preferably the product package 1 is produced from one individual, sheet-like, fiber-based blank of uniform thickness, in which the necessary scores and fold lines 8 have been made, the scores and fold lines preferably comprising perforations, i.e. the aforementioned apertures, made through the blank material at regular intervals in an essentially straight line.

FIG. 2 presents a side view of a product package 1 according to FIG. 1 and of the inner lining to be fastened onto its inner surface forming a food-grade film, i.e. more briefly, a film 1*a*, the inner lining being still unattached in the situation of FIG. 2. The film 1*a* that is the inner lining is e.g. food-grade plastic and after use it can easily be detached from the frame part, in which case the fiber-based frame part can be delivered to recycling and the film 1*a* as a separate fraction to plastic recycling.

The film 1*a* intended as an inner lining is fastened to the frame part and it is arranged to make the package airtight together with the lid, which lid is not presented in the figures. The fastening of the film 1*a* is performed e.g. in such a way that negative pressure is produced below the frame part, by means of which negative pressure the film 1*a* is sucked to attach to the inner surface of the frame part, to which inner surface it clings by virtue of its properties. The fastening occurs by sucking the air out from between the frame part and the film 1*a* placed inside it through the frame part by means of the negative pressure. To intensify the suction effect and to facilitate the folding into shape of a package there are fold lines 8 in the product package, suction of the film 1*a* onto the inner surface of the product package 1 being implemented via the apertures in said fold lines.

With the method described above, the film 1*a* that is the inner lining attaches in a leak-tight manner to the inside surface of the frame part and simultaneously makes the whole dish structure more robust.

With the method according to the invention more than one, preferably e.g. two, four or eight units, of the frame parts of a dish-shaped product package 1 are produced with the same forming cycle by folding essentially straight group blanks 9 mechanically with mould tools and by means of negative and/or positive pressure into product packages 1 of a dish shape. The inner surfaces and the top surfaces of the edge parts 6, 7 of the product packages 1 made with the same forming cycle are also essentially simultaneously provided with the aforementioned film 1*a*, which is fastened to the product packages 1 preferably immediately after the forming of the product packages 1. In the following, the production of the product packages 1 and fastening of the film are described in more detail.

FIGS. 3 and 4 present a top view of group blanks 9, which are used in the method according to the invention when producing product packages 1 with the apparatus according to the invention. Preferably, a group blank 9 comprises more than one individual blank 9*a* of a product package, the individual blanks being side by side. Suitably, there are e.g. 2, 3, 4, 5, 6 or even more individual blanks 9*a*, side by side and attached to each other, in one row. Preferably, all the individual blanks 9*a* of the product packages 1 in the same group blank 9 are similar to each other, and attached side by side to each other separated by a seam 8*a*. The seam 8*a* can be a perforation-type seam with holes or an otherwise weakened point, along which the individual blanks 9*a* detach from each other in the forming phase of a product package 1. One preferred structure of a seam 8*a* is such that there are long, straight and thin gaps in the seam and also narrow bridges transverse to the seam, the narrow bridges attaching adjacent individual blanks 9*a* to each other. The seam 8*a* can also be just a scored point, along which the side-by-side individual blanks 9*a* are cut from each other just before folding the individual blanks 9*a* into a mould.

FIG. 4 presents a group blank 9, which is otherwise similar to the group blank 9 presented in FIG. 3, but now the group blank 9 comprises two rows of individual blanks 9*a* attached to each other. In this case the individual blanks 9*a* are attached to each other both at their side edges and at their end edges. Suitably, there are e.g. 2, 3, 4, 5, 6 or even more individual blanks 9*a*, side by side and attached to each other, in two or more rows. In the forming phase, the individual blanks 9*a* are detached from the side edges of each other at the point of the seams 8*a* and from the end edges of each other at the point of the seams 8*b*. The seams 8*a* and 8*b* can be similar to those described in conjunction with the group blank 9 according to FIG. 3.

FIG. 5 presents a simplified side view of a part of one apparatus according to the invention for producing a dish-shaped product package. For the sake of clarity, FIG. 5 presents only a part of the structure of the apparatus and only some parts of the structure of the components presented.

The apparatus comprises a forming station 10 for dish-shaped product packages, in connection with which forming station is a primary tool 18, with support structures 18*a*, transverse support 18*b* and primary moulds 19, the primary tool functioning as an infeed tool; a secondary tool 20, with secondary moulds 21, functioning as a reception tool; a heating station 23 with hotplates and cutting devices; and also a reception station 24 with lifting means. Since the secondary moulds 21 are provided with a suction function producing negative pressure, the secondary moulds 21 can also be called suction moulds. The apparatus also comprises a control system in connection with it for controlling the functions of the apparatus.

Additionally, in connection with the apparatus is a film track 12 provided with folding rolls 13-16 for moving the thin film comprising food-grade plastic that is on the film roll 11 past the forming station 10. The film track 12 with film rolls 11, 17 and film can be common to all the product packages 1 to be formed side by side, in which case there can be only one film track 12, or there can be an own film track 12 with film rolls 11, 17 and film for each product package 1 to be formed, in which case there are just as many film tracks 12 side by side as there are product packages 1 to be formed side by side.

Each film comprises at least two consecutive parts, a first, i.e. an intact uncut part 12*a*, which leaves the film roll 11 and ends at the point of the cutting device that is in connection with the heating station 23, and a second, i.e. a cut residual part 12*b*, which starts at the point of the aforementioned cutting device and ends at the residual film roll 17.

In the forming station 10, the part cut away from the intact first part 12*a* of the film, i.e. the film 1*a* intended for an inner lining, is fastened to the second surface of the dish-shaped product packages 1 formed from the group blanks 9 in the forming station 10, preferably to the top surface, which part can also be called the inner surface. After cutting and fastening, the second part of the film containing cutaways, i.e. the residual film 12*b*, is driven along the film track 12 guided by the folding rolls 14-16 onto the residual film roll 17.

The width of the film is as small as possible, however as large as the width of the group blanks 9, and corresponds to the width of the group blanks 9 in such a way that, after cutting, thin strips remain on both edges of the residual film 12*b*, the strips enabling the residual film 12*b* to be run onto the residual film roll 17.

The heating station 23 and its hotplates, said hotplates disposed one beside another, are in the forming station 10, preferably directly above the secondary moulds 21 and the intact first part 12*a* of the film, each hotplate above one secondary mould 21. The number of hotplates is the same as the number of individual blanks 9*a* side by side in a group blank 9.

The primary moulds 19 in a primary tool 18 are fastened side by side in a straight line. The number, size and interpositioning of the primary moulds 19 correspond to the number, size and interpositioning of the individual blanks 9*a* in the group blanks 9. The primary tool 18 comprises actuators for transferring group blanks 9 onto the secondary moulds 21 from the blank pallet 22. The actuators comprise e.g. means for moving the primary tool 18 back and forth in the horizontal and vertical directions, and means for the primary moulds 19 to grip the top surface of the group blanks 9, e.g. by means of suction, and means for lowering the group blanks 9 to the correct point on top of the secondary moulds 21. The means also comprise, inter alia, various sensors and measuring devices.

Preferably directly below the heating station 23 is a secondary tool 20 with secondary moulds 21 and suction hoses 28, via which suction is enabled in the secondary moulds 21. The secondary moulds 21 are fastened in a straight row side by side with each other. For forming the frame of dish-shaped product packages 1, the number, size and interpositioning of the secondary moulds 21 correspond to the number, size and interpositioning of the primary moulds 19 and of the individual blanks 9*a* in the group blanks 9. Additionally, the apparatus comprises actuators for moving the secondary moulds 21 back and forth at least in the vertical direction, and in certain embodiments back and forth also in the horizontal direction.

The reception station 24 with its lifting means is preferably disposed on the front part of the forming station near the secondary moulds 21. After fastening of the film 1*a* functioning as the inner lining, the product packages 1 are transferred from the secondary moulds 21 to the reception station 24 e.g. by the aid of a gripping means moving back and forth. From the reception station 24, the product packages 1 provided with an inner lining are transferred to further processing, e.g. to filling and lid fastening, in conjunction with which a food portion, or foodstuff, intended for it is placed into the product package.

FIG. 6 presents a simplified front view of a part of one apparatus according to FIG. 5 for producing a dish-shaped product package. In the apparatus and in the method according to FIG. 6 the forming of a product package 1 is performed as a group forming, four product packages at a time. In this solution, the secondary moulds 21 are held stationary all the time with respect to each other in the sideways direction, and for minimizing film wastage the film used for an inner lining is pre-cut in the width direction, to a specific dimension in relation to the width of each product package 1 to be formed, to be as narrow as possible. There is a dedicated film track 12, with film rolls 11 and 17, for each product package 1 to be formed, i.e. in this case four film tracks 12 side by side. The horizontal distance from each other of the films on the film tracks 12 corresponds to the horizontal distance from each other of the secondary moulds 21. Each film track 12 can have its own folding rolls 13-16 or only one common roll per each roll for all the film tracks 12, which extend over all four film tracks 12.

FIG. 6 presents a situation in which the primary tool 18 is bringing one group blank 9 onto the secondary moulds 21 for forming product packages 1. For the sake of clarity, FIG. 6 does not present the heating station 23 above the first part 12*a* of the film behind the folding rolls 14. Openings 25, from which the film 1*a* used for the inner lining has been cut out, are seen in the residual films 12*b*. Between the apertures 25 is a short transverse film bridge for keeping the residual films 12*b* as intact as possible to safeguard operation.

In the description of the method according to the invention two methods and apparatuses are presented in the following, wherein the forming of product packages 1 is performed one such group blank 9 at a time, a group blank comprising four individual blanks 9*a* side by side in a row, one individual blank attached at one of its sides to another. In the method according to the invention, the forming of dish-shaped product packages 1 and fastening of the film 1*a* used for an inner lining to the second surface, preferably the inner surface, is performed e.g. in the following manner:

At the start of the forming phase, a group blank 9 is taken from the blank stack that is on the blank pallet 22, e.g. by means of suction, and transferred to on top of the secondary moulds 21 in the secondary tool 20. Preferably the group blank 9 comprises four individual blanks 9*a* attached to each other at one of their sides. Preferably the secondary moulds 21 are disposed one beside another in such a way that the number, size and interpositioning of the primary moulds 21 correspond to the number, size and interpositioning of the individual blanks 9*a* of the product packages 1 in the group blanks 9.

When the group blanks 9 are above the secondary moulds 21 supported by the primary moulds 19, one individual blank 9*a* of the group always at the point of one secondary mould 21, either the top moulds or the secondary moulds 21 are moved, all at the same time, in such a way that the top moulds and the secondary moulds press against each other and the group blank 9 remains between the top moulds and secondary moulds.

After this, the forming of the product package 1 is carried out by pressing the individual blanks 9*a* according to prior art into their position in the secondary moulds 21 mechanically, and/or by means of suction and/or by means of pressure. In the method, all the individual blanks 9*a* that were in a group blank 9 are formed into product packages 1 simultaneously, i.e. in this case four product packages 1 are formed at the same time.

After forming, a film 1*a* is fastened as an inner lining to the top surface of the edge parts 6, 7 of the inside surface of the product packages 1. For this function, the secondary moulds 21 with product packages 1 are lifted onto the bottom surface of the first part 12*a* of the film that is on the film track 12, and the heating station 23 hotplates at the point of the product packages 1 are pressed onto the top surface of the first part 12*a* of the film. The fastening of the film 1*a* essentially simultaneously to the top surface of all the product packages 1 is performed according to prior art by means of both mechanical pressure and suction and/or pressure.

After fastening of the films 1*a* the secondary moulds 21 are lowered into position to await the next forming cycle and the product packages 1 are removed from the secondary moulds to the reception station 24.

After this, the work cycle of the forming phase can start from the beginning.

FIGS. 7-9 present one second preferred method and apparatus according to the invention for producing a dish-shaped product package. In this solution the apparatus according to the invention differs from the apparatus presented above only insofar as the apparatus comprises means for moving the secondary moulds 21 towards each other and away from each other. Likewise, the apparatus comprises a control system and a sensor & measuring arrangement suited to the purpose for controlling the moving of the secondary moulds 21.

The means for moving the secondary moulds 21 in relation to each other preferably comprise one or more actuators 27, such as a linear servomotor, pneumatic cylinder or hydraulic cylinder, which is preferably connected to the control system of the apparatus and is adapted to move the secondary moulds 21 on guide rails 26 both towards each other and away from each other in the direction of the mould row. In the forming phase of the product packages 1, the secondary moulds 21 are farther away from each other and in the fastening phase of the film 1*a* intended as an inner lining the secondary moulds 21 are nearer to each other, preferably essentially in contact with each other. In one preferred solution, the outermost secondary mould 21 is arranged to remain firmly in its position and the other secondary moulds 21 are arranged to be moved towards it and away from it. The arrangement can also be implemented in such a way that all the secondary moulds 21 are moved towards each other and away from each. A second preferred solution is to move all the secondary moulds 21, in conjunction with assembling the secondary moulds side by side, in the same direction and to assemble them by means of an actuator 27 to the side, with respect to the location of both outermost secondary moulds in the forming phase, and back.

Since this solution enables very low film wastage, it is necessary to use in the solution a film track 12 with folding rolls 13-16 and with film rolls and residual film rolls 11, 17 that are narrower than in the apparatus implementing the method described in FIG. 6. If the secondary moulds 21 are not quite in contact with each other in the fastening phase of the film 1*a*, webs in the longitudinal direction of the film can remain in the residual film 12*b* at the point of the gaps between the secondary moulds 21, in which case, instead of one wide opening 25, there is a row of side-by-side narrower openings 25 in the residual film 12*b*.

FIG. 7 presents a situation in which a group blank 9 comprising four individual blanks 9*a* side by side is being transferred to the secondary moulds 21 for simultaneously forming four dish-shaped product packages 1 from a sheet-like group blank 9. FIG. 8 presents a situation in which a plurality of dish-shaped product packages have just been formed by pressing the individual blanks 9*a* of a group blank 9 into side-by-side secondary moulds 21. The method phases of FIGS. 7 and 8 can be the same as the method phases according to FIG. 6.

Correspondingly, FIG. 9 presents a situation in which the secondary moulds 21 of the apparatus have been moved against each other and are preparing for the covering of the inner surface of the product packages 1 just formed with the film 1*a* forming an inner lining. When the product packages 1 to be made at one time have been formed, the primary tool 18 with primary moulds 19 is transferred away from the trajectory of the secondary moulds 21, and the secondary moulds 21 in the row that are at a distance from each other are transferred by means of one or more actuators 27 towards each other, preferably against each other.

After this, the secondary moulds 21, with product packages 1, that are in contact with each other or at least closer than in the forming phase, are lifted onto the bottom surface of the first part 12*a* of the film that is on the film track 12, and the heating station 23 hotplates at the point of the product packages 1 are pressed onto the top surface of the first part 12*a* of the film. The fastening of the film 1*a* that is an inner lining simultaneously to the top surface of all the product packages 1 is performed according to prior art by means of mechanical pressure and also by means of suction and/or pressure.

After fastening of the films 1*a*, the secondary moulds 21 are lowered into position and transferred by means of one or more actuators 27 farther from each other to their locations for the forming phase to await the next forming cycle, and the product packages 1 are removed from the secondary moulds to the reception station 24. The product packages 1 can be removed from the secondary moulds 21 also before transferring the secondary moulds 21 to their locations for the forming phase.

After this, the work cycle of the forming phase can start from the beginning.

It is obvious to the person skilled in the art that the invention is not limited solely to the examples described above, but that it may be varied within the scope of the claims presented below. Thus, for example, some structural solutions can also be different to what is presented above. In this case e.g. the number of individual blanks side by side and one after another in the group blanks can vary. There can be e.g. 2, 3, 4, 5, 6, 7, 8 or more individual blanks side by side, and instead of one there can be 2, 3, 4, 5, 6, 7, 8 or more individual blanks one after another.

It is further obvious to the person skilled in the art that the product packages can be of some other material than recyclable fiber material. Thus, the frame part of a product package can be produced from some other foldable material than corrugated board. The frame part of a product package can be produced e.g. from different boards, cardboards or papers or also from woven material, or from combinations of different materials.

It is also obvious to the person skilled in the art that positive pressure can also be used as an aid in fastening the inner lining in conjunction with manufacture, by means of which positive pressure the inner lining is pressed against the inner surface of the frame part of the product package. In such a case the apparatus comprises means for producing positive pressure in the fastening phase of the inner lining on the opposite side to the inner lining with respect to the frame part of the product package. Positive pressure, i.e. in this case by means of blowing, enhances the formation of the inner lining film on the edge parts of the product package.

It is also obvious to the person skilled in the art that the film track can also be transverse with respect to the longitudinal direction of the product packages to be formed. In this solution the secondary moulds are either held stationary all the time with respect to each other in the sideways direction, or before fastening of the film functioning as an inner lining the secondary moulds are moved together in the manner described above, and to minimize film wastage the film on the film track is pre-cut in the width direction of the film to the specified dimension, in relation to the length of each product package to be formed, so as to be as narrow as possible. Preferably, there is a dedicated film track with film roll for each product package row to be formed at the same time.

It is also obvious to the person skilled in the art that instead of a film of one width, with which all the individual blanks of one group blank can be lined at the same time, also narrower films can be used in the solution according to the invention. In such a case e.g. two films side by side are used, each having sufficient width to cover one-half of the number of individual blanks of a group blank, e.g. two individual blanks when there are four individual blanks in the group blank.

It is also obvious to the person skilled in the art that instead of the vertical operating direction described in the embodiments above, many functions can be implemented in other directions, e.g. in the horizontal direction. In this case the primary tools and secondary tools with their primary moulds and secondary moulds do not need to operate on the same line as each other on a vertical plane, but instead on another plane, e.g. a horizontal plane.

The invention claimed is:

1. An apparatus for producing dish-shaped product packages, the apparatus comprising: a forming station (10) for product packages (1), in connection with the forming station (10) is a secondary tool (20) with secondary moulds (21) side by side with each other, a heating station (23) and a primary tool (18) with primary moulds (19) for feeding sheet-like, fiber-based, individual blanks (9*a*) of product packages (1) into to the secondary tool (20) forming of product packages (1), and the apparatus further comprises a control system for controlling the functions of the apparatus, and in connection with the apparatus is a film track (12) for providing a formed product package (1) with a film (1*a*) functioning as an inner lining, characterized in that the primary tool (18) comprises two or more primary moulds (19) side by side, and in that the apparatus comprises means for moving secondary moulds (21) towards each other and away from each other after the forming of the product packages (1), in which case the means for moving the secondary moulds (21) towards each other and away from each comprise one or more actuators (27) connected to the control system of the apparatus.

2. The apparatus according to claim 1, characterized in that the primary tool (18) comprises gripping means for feeding a group blank (9) formed by two or more individual blanks of a product package (1), the individual blanks (9*a*) being side by side and attached to each other, to the secondary tool (20).

3. The apparatus according to claim 2, characterized in that the horizontal distance between the primary moulds (19) in the primary tool (18) is the same as the horizontal distance between the side-by-side individual blanks (9*a*) in a group blank (9) to be fed in with the primary tool (18).

4. The apparatus according to claim 3, characterized in that the number of primary moulds (19) in in the primary tool (18) is the same as the number of individual blanks (9*a*) side by side in a group blank (9) to be fed in with the primary tool (18).

5. The apparatus according to claim 1, characterized in that one secondary mould (21) of a secondary mould row is arranged to stay in position and the other secondary moulds (21) of the secondary mould row are arranged to be moved by means of an actuator (27) both towards the stationary secondary mould (21) and also away from it.

6. The apparatus according to claim 1, characterized in that all the secondary moulds (21) of a secondary mould row are arranged to be moved by means of an actuator (27) in the same direction, for assembling the secondary moulds to the side of one of the outermost secondary moulds of the forming phase, and back.

7. The apparatus according to claim 1, characterized in that the width of the film of the film track (12) is smaller than the horizontal distance between the outer edges of the two outermost primary moulds (19) of a primary mould row.

8. The apparatus according to claim 1, characterized in that in connection with the apparatus are two or more film tracks (12) side by side, one film track (12) for each individual blank (9*a*) side by side in a group blank (9) of a product package (1), or one film track (12) for more than one individual blank (9*a*) side by side in a group blank (9) of a product package (1).

9. The apparatus according to claim 8, characterized in that the horizontal distance between the longitudinal center lines of side-by-side film tracks (12) is the same as the horizontal distance between the center points of the secondary moulds (21).

* * * * *